United States Patent [19]

Futamase et al.

[11] 4,267,763

[45] May 19, 1981

[54] FUNCTION GENERATORS OF TIME-DEPENDENT VARIABLE TYPE

[75] Inventors: Tsuyoshi Futamase; Masanobu Chibana, both of Hamamatsu, Japan

[73] Assignee: Nippon Gakki Seizo Kabushiki Kaisha, Hamamatsu, Japan

[21] Appl. No.: 87,660

[22] Filed: Oct. 24, 1979

[30] Foreign Application Priority Data

Oct. 28, 1978 [JP] Japan ............................... 53/133001

[51] Int. Cl.[3] .......................... G10H 1/06; G06F 1/02

[52] U.S. Cl. ...................................... 84/1.22; 84/1.26; 364/569; 364/722

[58] Field of Search ...................... 84/1.01, 1.03, 1.19, 84/1.21, 1.22, 1.23, 1.26; 364/718, 719, 722, 569

[56] References Cited

U.S. PATENT DOCUMENTS

| | | | |
|---|---|---|---|
| 3,632,996 | 1/1972 | Paine et al. | 364/722 |
| 3,952,623 | 4/1976 | Deutsch | 364/718 |
| 4,138,915 | 2/1979 | Nagai et al. | 84/1.19 |
| 4,215,614 | 8/1980 | Chibana | 84/1.01 |

*Primary Examiner*—J. V. Truhe

*Assistant Examiner*—Forester W. Isen

*Attorney, Agent, or Firm*—Thompson, Birch, Gauthier & Samuels

[57] ABSTRACT

A function generator of time-dependent variable type especially suitable for use as an envelope waveshape generator of an electronic musical instrument is constituted by means for setting multi-bit digitalized information which represents time information in terms of a logarithm, dividing means for dividing the bits of the time information into upper order bits and lower order bits at a bit of a predetermined order, means for converting a portion of the information represented by the lower order bits into linear information, a timing pulse generator which produces a timing pulse having a period corresponding to a value obtained by converting a portion of the information represented by the higher order bits into a natural number, and an accumulator for accumulating the output produced by the information converting means at a period of the timing pulse thereby producing an accumulated value as the time function waveshape which varies with time at a rate corresponding to the time information.

10 Claims, 10 Drawing Figures

FUNCTION GENERATORS OF TIME-DEPENDENT VARIABLE TYPE

BACKGROUND OF THE INVENTION

This invention relates to a function generator of time-dependent variable type which generates a time function waveshape which varies with time at a rate corresponding to time information applied externally for determining a time-dependent variable.

A function generator of time-dependent variable type which generates a time function waveshape varying with time is used as an envelope waveshape or control waveshape generator which generates waveshapes for imparting to a musical tone generated by an electronic musical instrument such amplitude envelopes or other control waveshapes as attack, sustain and decay. The envelope waveshape generator of this type is constructed to be set with an attack time (build-up time) as well as a decay time (build down time) of an envelope waveshape generated thereby by external information in any desired manner. More particularly, such envelope waveshape generator is constructed such that numerical value information for determining a time dependent variable regarding the attack time are repeatedly counted by a counter, and then repeatedly counting time information (numerical value information) regarding the decay time to form an envelope waveshape based on the count of the counter. The count of the counter varies at a rate corresponding to the time information so that the larger is the time information, the faster is the rate of changing the count and vice versa. Accordingly, the attack time and the decay time of the envelope waveshape which are formed based upon the count of the counter correspond to the time information. This type of an envelope waveshape generator is disclosed in U.S. Pat. No. 4,083,285 issued on Apr. 11, 1978.

Since the time information is generally expressed linearly by digital data having a limited number of bits, the length of the time set by the information is limited with the result that it is impossible to increase the length of the set time of the envelope waveshape. To solve this disadvantage, it has been proposed to increase the number of bits of the time information so as to increase the length of the set time. However, such proposal increases the size of the circuit.

SUMMARY OF THE INVENTION

Accordingly, it is the principal object of this invention to provide a function generator of time-dependent variable type capable of producing a time function waveshape having increased time setting variety which is set by time information for determining a time-dependent variable, said time information having a relatively small number of bits, thus simplifying the construction and decreasing the cost of manufacturing.

To accoplish this object, according to this invention, time information for determining a time-dependent variable is expressed by a logarithm. Moreover, the time information is divided into upper order bits and lower order bits on both sides of a bit of a predetermined order. The lower order bits are used to obtain linear information, whereas the upper bits are used to generate a timing pulse.

According to this invention, there is provided a function generator of time-dependent variable type which generates a time function waveshape which varies with time at a rate corresponding to time information for determining a time-dependent variable, comprising means for setting multi-bit digitalized information which represents the time information in terms of a logarithm; means for dividing the bits of the time information into upper order bits and lower order bits at a bit of a predetermined order; means for converting a portion of the information represented by the lower order bits into linear information; a timing pulse generator which produces a timing pulse having a period corresponding to a value obtained by converting a portion of the information represented by the higher order bits into a natural number; and accumulating means for accumulating the information produced by the information converting means at a period of the timing pulse generated by the timing pulse generating means thereby producing an accumulated value as the time function waveshape which varies with time at a rate corresponding to the time information.

DESCRIPTION OF THE PREFERRED EMBODIMENT

Figure 1:
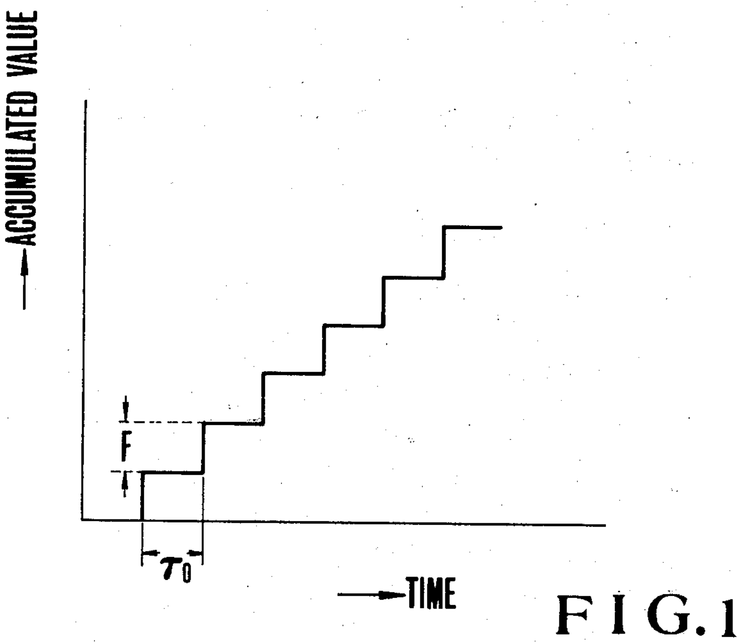
FIG. 1 shows a waveshape useful to explain the principle of this invention.

The invention will now be described with reference to one embodiment utilizing time information for determining a time-dependent variable in terms of a decibel representation.

The principle of the function generator of time-dependent type characterizing the invention will firstly be described.

1. Assume now that time information for determining a time-dependent variable utilized to determine the change rate of the time function waveshape comprises 6 bits and that each bit is applied with a weight corresponding to a decibel value as shown in the following Table 1. The respective bit information of the upper order four bits or the four most significant bits of 6 dB, 12 dB, 24 dB and 48 dB are utilized to represent 6 dB-step information ranging from 0 dB to 90 dB.

TABLE 1

| | MSB | | | | | LSB | |
|---|---|---|---|---|---|---|---|
| dB | 48 | 24 | 12 | 6 | 3 | 1.5 | |
| | 0 | 0 | 0 | 0 | 0 | 0 | 0dB |
| | 0 | 0 | 0 | 0 | 0 | 1 | 1.5dB |
| | 0 | 0 | 0 | 0 | 1 | 0 | 3dB |
| | 0 | 0 | 0 | 0 | 1 | 1 | 4.5dB. |
| | 0 | 0 | 0 | 1 | 0 | 0 | 6dB |
| | . | . | . | . | . | . | . |
| | . | . | . | . | . | . | . |

TABLE 1-continued

| MSB | | | | | LSB | |
|---|---|---|---|---|---|---|
| . | . | . | . | . | . | . |
| . | . | . | . | . | . | . |
| 1 | 1 | 1 | 1 | 1 | 1 | 94.5dB |

2. When a 16 bit binary counter is permitted to run freely by a clock pulse having a predetermined period $\tau$, respective bits thereof produce pulse signals having 16 types of periods of from $2^1 \cdot \tau$ through $2^{16} \cdot \tau$. Consequently, when 16 types of these pulse signals are selected by combining the respective values represented by the upper 4 bits at orders higher than 6 dB according to Table 2 below, a timing pulse having the longest period of $2^{16} \cdot \tau$ is obtained when the time information is less than 6 dB, whereas when the time information is not smaller than 90 dB (upper order 4 bits are all "1") a timing pulse having the shortest period $2^1 \cdot \tau$ would be obtained. More particularly, the selector produces timing pulses having periods corresponding to the values obtained by converting decibel values (logarithmic values) represented by combinations of the upper order 4 bits of the time information into natural numbers.

TABLE 2

| | | | | | | |
|---|---|---|---|---|---|---|
| time information | 0dB | 6dB | 12dB | 18dB | 24dB | 30dB |
| period of timing pulse | $2^{16} \cdot \tau$ | $2^{15} \cdot \tau$ | $2^{14} \cdot \tau$ | $2^{13} \cdot \tau$ | $2^{12} \cdot \tau$ | $2^{11} \cdot \tau$ |
| time information | 36dB | 42dB | 48dB | 54dB | 60dB | |
| period of timing pulse | $2^{10} \cdot \tau$ | $2^9 \cdot \tau$ | $2^8 \cdot \tau$ | $2^7 \cdot \tau$ | $2^6 \cdot \tau$ | |
| time information | 66dB | 72dB | 78dB | 84dB | 90dB | |
| period of pulse | $2^5 \cdot \tau$ | $2^4 \cdot \tau$ | $2^3 \cdot \tau$ | $2^2 \cdot \tau$ | $2^1 \cdot \tau$ | |

3. Among the time informations for determining time-dependent variables, the respective bits of the lower order 2 bits or the two least significant bits correspond to the values of of 3 dB and 1.5 dB. The values 3 dB and 1.5 dB correspond to linear values of $2^{1/2}$ and $2^{1/4}$, respectively. To accomplish this logarithmic to linear conversion using an extremely simple construction, the invention adroitly utilizes the following method: the respective lower two bits are given with weight of $2^{-1}$ and $2^{-2}$ and another bit always held "1" is provided as a most significant bit with respect to these two bits. Thus, it is possible to convert the 1.5 dB-step time informations less than 6 dB into quasi-linear information F as shown in the following Table 3.

TABLE 3

| lower 2 bits of time information | | quasi-linear information | | | | inherent linear information |
|---|---|---|---|---|---|---|
| | | MSB | | LSB | decimal | (ideal decimal |
| 3dB | 1.5B | $2^0$ | $2^{-1}$ | $2^{-2}$ | value | value) |
| 0 | 0 | 1 | 0 | 0 | 1.000 | (1.0000) |
| 0 | 1 | 1 | 0 | 1 | 1.250 | 1.1892 |
| 1 | 0 | 1 | 1 | 0 | 1.500 | 1.4142 |
| 1 | 1 | 1 | 1 | 1 | 1.750 | 1.6818 |

Consequently, when these quasi-linear information is sequentially accumulated by the timing pulse having a period corresponding to the upper 4 bits of the time information described above, the accumulated value varies with time at a period $\tau_0$ (either one of $2^1 \cdot \tau$ to $2^{16} \cdot \tau$) whereby the quasi-linear information F represented by the 2 lower order bits of the time information varies with time at a rate corresponding to a value obtained by linearizing the information represented by the upper 4 bits, as shown in FIG. 1. Accordingly, when the accumulated value is converted into a time function waveshape, the setting range of the time information is increased greatly to a value obtained by linearizing the time information.

The detail of the function generator of time dependent variable utilizing this principle will now be described.

Figure 3:
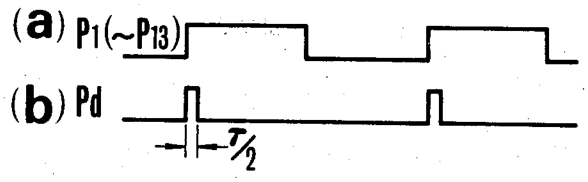
FIG. 3 is a time chart for explaining the operation of the function generator shown in FIG. 2.
Figure 2:
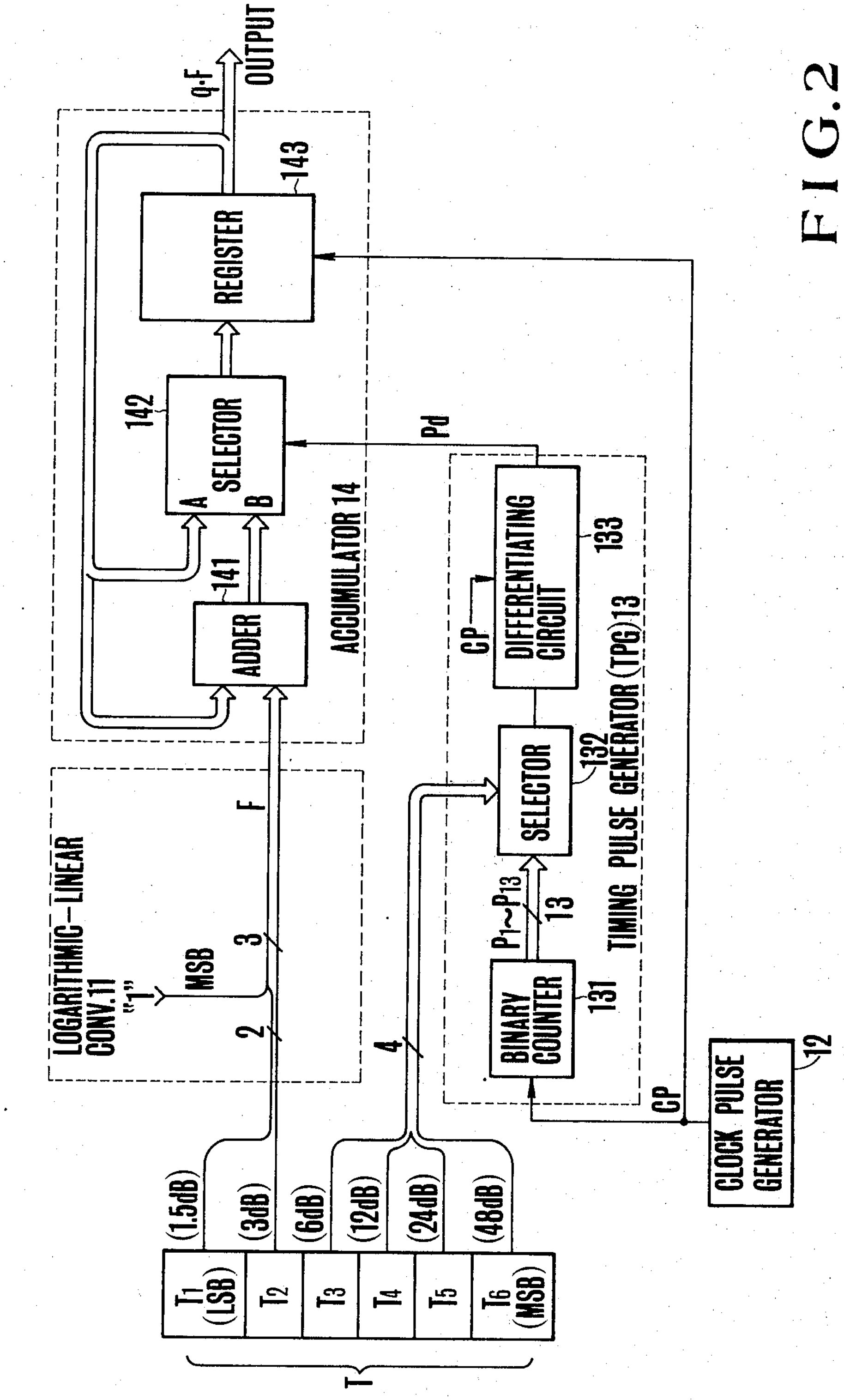
FIG. 2 is a block diagram showing one embodiment of a function generator of time-dependent variable according to this invention.

A preferred embodiment of the function generator is shown in FIG. 2 in which the time information for determining the time-dependent variable is generally denoted by T constituted by 6 bits T1 through T6 identical to those described above, each bit being applied with a weight corresponding to each decibel value as shown in Table 1. More particularly, bit T1 corresponds to the least significant bit (LSB) applied with a weight to become 1.5 dB, while bit T6 corresponds to the most significant bit (MSB) applied with a weight to become 48 dB. In this embodiment, the time width designated by the upper 4 bits T6 to T3 of the time information T is limited to a maximum of 72 dB (that is T6, T5, T4 and T3 have values of "1100"). There are provided a logarithmic-linear converter 11 (hereinafter called an LLC) which operates to add "1" ($2^0$) as the upper order bit of the lower two bits T1 and T2 of the time information T to convert these two lower bits T1 and T2 into quasi-linear information F, a clock pulse generator 12 which generates a clock pulse Cp having a predetermined period $\tau$, and a timing pulse generator 13 which produces a timing pulse Pd having a period designated by a combination of the upper 4 bits T3 to T6 corresponding to decibel values not smaller than 6 dB among the bits of the time information T. The timing pulse generator 13 is constituted by a 13 bit binary counter 131 which counts the number of the clock pulse Cp for producing output pulses P1 (corresponding to $2^1 \cdot \tau$) through P13 (corresponding to $2^{13} \cdot \tau$) having pulse periods of 13 types of $2^1 \cdot \tau, 2^2 \cdot \tau, 2^3 \cdot \tau \ldots 2^{13} \cdot \tau$, a selector 132 which selects and produces one of the pulse signals P1 to P13 produced by the binary counter 131 and designated by the combination of upper 4 bits T3 to T6 of the time information T, and a differentiating circuit 133 which differentiates the building-up portion of one of the pulses P1 to P13 (see FIG. 3*a*) produced by the selector 132 to produce a timing pulse Pd having the same pulse width ($\tau/2$) as the clock pulse Cp and a period designated by a combination of upper 4 bits T3 to T6 of the time information T. Thus, the period of the timing pulse Pd generated by the timing pulse generator 13 is set such that the period becomes shorter as the value represented by the upper 4 bits T3 to T6 of the time information T increases. The relationship between the contents of the upper 4 bits of the time information T and the pulse signals P1 to P13 produced as the timing pulses Pd is shown by the following Table 4. For this reason, as the value of the time information T increases, the frequency of the timing pulse Pd increases. The variation in the length of the period becomes 1, 2, 4 . . . 4096 times in terms of linear values. Thus, the timing pulse generator 13 generates a timing pulse Pd having a period corresponding to a value obtained by linearizing a value representing the upper 4 bits T3 to T6 of the time information T.

TABLE 4

| time information T | | | | time pulse Pd | |
|---|---|---|---|---|---|
| T6 | T5 | T4 | T3 | pulse signal | Period |
| 0 | 0 (0dB) | 0 | 0 | P13 | 4096 $\tau$ |
| 0 | 0 (6dB) | 0 | 1 | P12 | 2048 $\tau$ |
| 0 | 0 (12dB) | 1 | 0 | P11 | 1024 $\tau$ |
| . | . | . | . | . | . |
| . | . | . | . | . | . |
| . | . | . | . | . | . |
| . | . | . | . | . | . |
| 1 | 0 (66dB) | 1 | 1 | P2 | 2 $\tau$ |
| 1 | 1 (72dB) | 0 | 0 | P1 | $\tau$ |

There is also provided an accumulator 14 which operates to sequentially accumulates the quasi-linear information F produced by the LLC 11 at each generation of the timing pulse Pd and to produce the accumulated value as a time function q·F (q=1, 2, 3 . . . ) which varies with time at a rate corresponding to the time setting information T. The accumulator 14 comprises an adder 141 which adds the accumulated value q·F produced by a register 143 to be described later to the quasi-linear information F, a selector 142 which selects the sum (q·F+F) applied to its input B from adder 141 when the timing pulse Pd produced by the timing pulse generator 13 is "1", whereas selects the accumulated value q·F applied to its input A from the register 143 when the timing pulse Pd is "0", and a register 143 which stores the output of the selector 143 when the clock pulse Cp is "1". The selector 142 is constructed such that the sum (q·F+F) of the adder 141 is stored in the register 143 through the selector 142 each time a timing pulse Pd is generated. Consequently, the accumulator 14 produces an accumulated value q·F which increases gradually from an initial value by the quasi-linear information F each time the timing pulse Pd is generated.

In other words, the accumulated value q·F varies by a value of the quasi-linear information F at a period of the timing pulse Pd, with the result that the accumulated value q·F is a time function signal which varies with time at a rate corresponding to a value obtained by linearizing a value represented by the time information T.

The embodiments described above operates as follows.

When a power source switch (not shown) is closed, the binary counter 131 of the timing pulse generator 13 counts the number of the clock pulses Cp to parallelly produce pulse signals P1 through P13 having periods of $2^1\cdot\tau$ through $2^{13}\cdot\tau$ respectively. Under these conditions, when the time information T is at 0 dB (that is T6 to T1 are all "0") the selector 132 of the timing pulse generator 13 selects and produces a pulse signal P13 having the longest period produced by the binary counter 131 corresponding to the 0 dB of the time information T (see a column of Table 4 in which T6 to T3 are "0000") and the selected output is applied to the differentiating circuit 133 which differentiates the build-up portion of the pulse signal P13 produced by the selector 132 to produce a timing pulse Pd having the same width as the clock pulse Cp and a period of $2^{13}\cdot\tau$.

In the logarithmic-linear converter 11, "1" is always added to a bit at a higher order than the lower two bits T1 and T2 of the time information T to produce a quasi-linear information F=1 (see Table 3) which is sequentially accumulated by the accumulator 14 to produce 1, 2, 3 . . . each time a timing pulse Pd is generated and the accumulated value q (q=1, 2, 3 . . . ) is stored in the register 143 when the timing pulse Pd is "1". Consequently, the register 143 of the accumulator 14 produces an accumulated value in which the quasi-linear information F=1 sequentially increases each time a timing pulse Pd is generated.

Thus, in this case, the accumulated value q·F varies by "1" at a period of $2^{13}\cdot\tau$ ($4096\cdot\tau$) and the accumulated value q·F is represents a time function waveshape q·F which varies with time at a rate corresponding to a value obtained by linearizing a value "0 dB" represented by the time information T.

A case wherein 72 dB is set for the time information T, and T6 to T1 is represented by "110000" will now be described. At this time, the selector 132 of the timing pulse generator 13 selects and produces a pulse signal P1 having a minimum period $2^1\cdot\tau$ corresponding to the time information T at 72 dB (see Table 4). Then, the differentiating circuit 133 differentiates the build-up portion of the pulse signal P1 to produce a timing pulse Pd having the same width as the clock pulse Cp and having a period of $2^1\cdot\tau$. On the other hand, the logarithmic-linear converter 11 converts a value of 0 dB represented by the lower 2 bits T1 and T2 of the time information T into quasi-linear information F and produces it as F=1. This quasi-linear information F=1 is sequentially accumulated by the accumulator 14 each time a timing pulse Pd having a period $2^1\cdot\tau$ is generated. As a consequence, the accumulator 14 produces an accumulated value q·F in which the quasi-linear information F=1 gradually increases each time a timing pulse of a period of $2^1\cdot\tau$ is generated. In other words, the accumulated value q·F varies by "1" at a period of $2^1\cdot\tau$ ($2\cdot\tau$), thus forming a time function waveshape q·F which varies with time at a rate corresponding to a value obtained by linearizing a value "72 dB" represented by the time information T.

Thus, in this embodiment, the accumulated value q·F of the quasi-linear information F corresponding to the lower 2 bits T1 and T2 of the time information T is caused to vary at a rate of $2^1\cdot\tau$ to $2^{13}\cdot\tau$. In other words the rate for varying with time the function waveshape q·F can be set in a range of $1\cdot\tau$ to $4906\cdot\tau$ by the time information having only 6 bits. Moreover, it is possible to vary the height of the step of varying the accumulated value q·F by the lower two bits T1 and T2 of the time information T and it is possible to independently set the rate of varying the accumulated value by the upper four bits T3 to T6. Accordingly, a suitable combination of these means is used as an envelope waveshape generator of an electronic musical instrument to generate an envelope waveshape which can be varied as desired.

One embodiment in which the function generator described above is applied to an envelope waveshape generator of an electronic musical instrument will now be described with reference to FIG. 4. The electronic musical instrument shown therein is constructed to provide a polyphonic performance and comprises 16 tone generating channels thus can simultaneously generate a maximum of 16 types of musical tones. The electronic musical instrument shown in FIG. 4 comprises a clock pulse generator 22 which generates a master clock pulse $\phi$ having a predetermined period $\tau m$, a key switch circuit 25 of a keyboard, a key assigner 26, a tone color selector 27, a musical tone signal generator 28, an envelope waveshape generator 29, an adder 30, and a sound system 31. The key assigner 26 detects the ON.OFF operations of key switches corresponding to respective keys of the keyboard so as to assign key data KD corresponding to a depressed key to either one of 16 tone generating channels and to produce on a time division basis the key data KD assigned to a given channel in synchronism with each channel time in accordance with the master clock pulse $\phi$. In this example, the key data KD is constituted by a 2 bit keyboard code KBC which discriminates an upper keyboard, a lower keyboard and a pedal keyboard, a 3 bit code representing an octave tone range, and a 4 bit code showing a tone note in each octave.

The key assigner 26 produces an attack clock pulse AP which shows that a musical tone is to be commenced in a tone generating channel to which a depressed key has been assigned, a decay start signal DS which shows that a depressed key assigned to a specific tone generating channel has been released so that the musical tone begins to attenuate, and a channel synchronizing signal SY16 synchronous with the 16th channel time each time all 16 tone generating channels have been operated during one cycle.

Thus, when the key data KD is generated on the time division basis in synchronism with a channel time, the musical tone generator 28 generates in response to the key data KD a musical tone signal log G having a frequency corresponding to the tone pitch of a depressed key and a tone color set by a tone color selecting signal TS produced by the tone color selector 27. The color selecting signal TS comprises 3 bits and by a suitable combination of these 3 bits it is possible to select 8 types of the tone colors (TS1 to TS8). The musical tone signal log G produced by the musical tone signal generator 28 is added by the adder 30 to the envelope waveshape signal EW produced by the envelope waveshape generator 29 so as to impart an amplitude envelope. The output of the adder 30 is converted into a linear musical tone signal by the sound system 31 to produce a musical tone. At this time, the envelope waveshape generator 29 is supplied with the attack pulse AP, the decay start signal DS, and the channel synchronizing signal SY16 of the key data produced by the key assigner 26 on the time division basis, and with a tone color selection signal TS produced by the tone color selector 27 thus producing the envelope waveshape EW for each tone generating channel.

Figure 5:
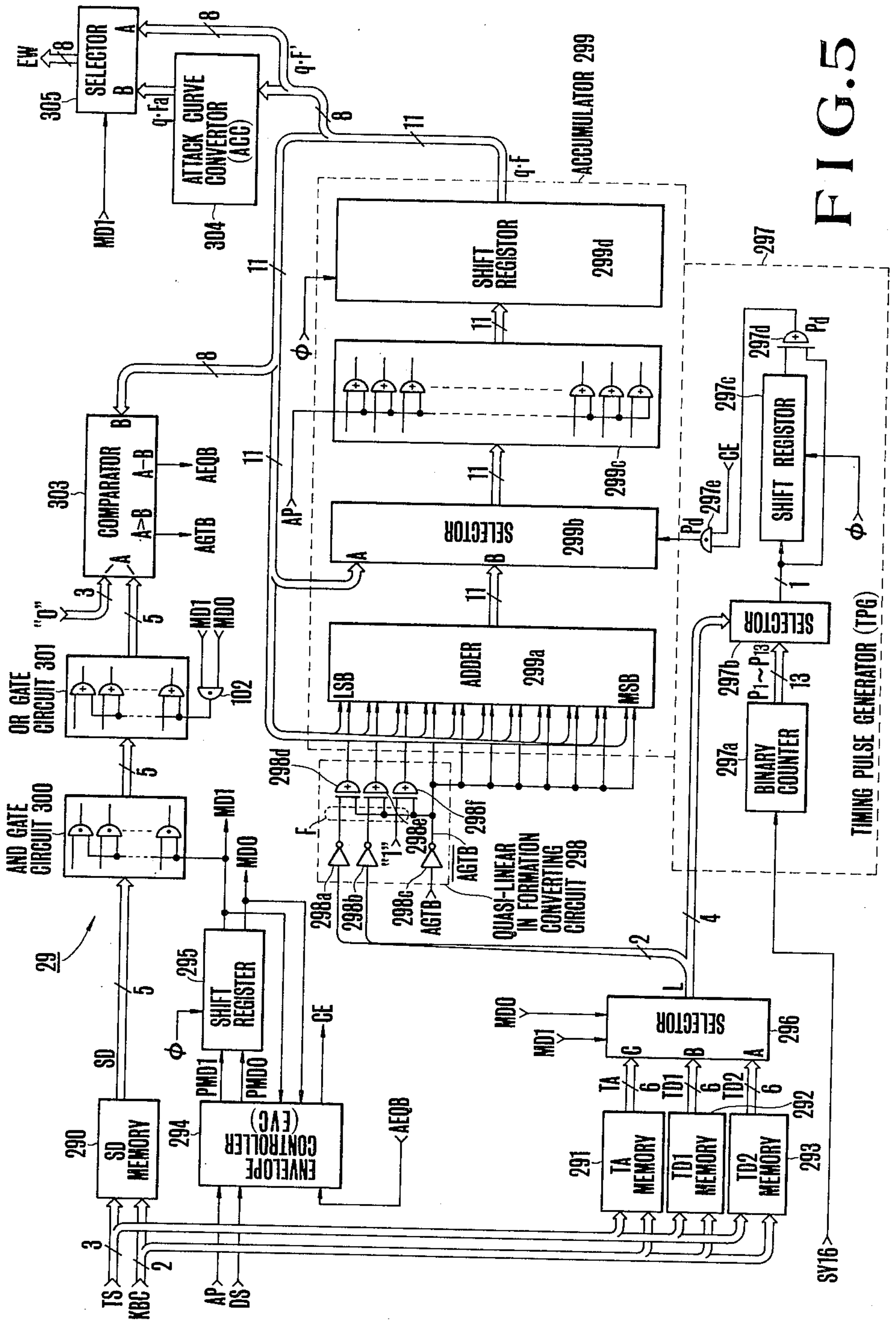
FIG. 5 is a block diagram showing the envelope waveshape generator utilized in the electronic musical instrument shown in FIG. 4.

The detail of the construction of the envelope waveshape generator 29 of the electronic musical instrument will now be described with reference to FIG. 5 in which the envelope waveshape generator 29 produces an 8 bit envelope waveshape signal EW as shown in FIG. 6*a*. When all 8 bits of this signal EW are "0", this state represents a maximum amplitude value (corresponding to an attack level AL), whereas when the bits are "11111000", this state represents a minimum amplitude value (corresponding to the final level FL). The envelope waveshape generator 29 shown in FIG. 5 comprises a sustain level setting information memory device 290 (SD memory device) which generates a sustain level setting information SD that designates the sustain level SL of the envelope waveshape signal EW shown in FIG. 6*a*, an attack time setting information memory device 291 (TA memory device) which produces an attack time setting information TA that designates the attack time AT of the envelope waveshape signal EW, a first decay time setting information memory device 292 (TD1 memory device) which produces a first decay time setting information TD1 that designates the first decay time TD1 of the envelope waveshape signal EW and a second decay time setting information setting memory device 293 (TD2 memory device) which produces a second decay time setting information TD2 that designates the second decay time 2DT of the envelope waveshape signal EW. The SD memory device 290, TA memory device 291, TD1 memory device 292 and TD2 memory device 293 are addressed by the tone color selection signal TS and the keyboard code KBC. Each of these memory devices 290 to 293 has eight memory blocks corresponding to the tone colors TS1 to TS8 determined by the tone selection signal TS, and each one of these memory blocks stores three types of information regarding the upper keyboard, the lower keyboard and the pedal keyboard determined by the keyboard code KBC.

More particularly, each memory block of the SD memory device 290 stores three types of the sustain level setting information SD corresponding to the color selection signal TS and the keyboard code KBC, and each memory block of TA memory device 291, TD1 memory device 292 and TD2 memory device 293 stores decibel information of three types of attack time setting information TA, the first decay time setting information TD1, the second decay time setting information TD2 corresponding to the tone color selection signal TS and to the keyboard code KBC. As a consequence, when these memory devices 290 to 293 are addressed by the tone color selection signal TS and the keyboard code KBC, the sustain level information SD corresponding to the tone color selection signal TS and the keyboard code KBC would be read out from the SD memory device 290, while the attack time setting information TA, the first decay time setting information TD1, and the second decay time setting information TD2 which are in the form of decibel and corresponding to the tone color selection signal TS and the keyboard code KBC are read out from TA memory device 291, TD1 memory device 292 and TD2 memory device 293 respectively, wherein the sustain level setting information SD comprises 5 bits, wherein the attack time setting information TA, the first decay time setting information TD1, and the second decay time setting information TD2 respectively comprise 6 bits. The weight applied to each bit is 48 dB for the MSB, 24 dB for the next order bit and 12 dB, 6 dB, 3 dB and 1.5 dB for the succeeding lower order bits in the same manner as in the previous embodiment shown in FIG. 2. There is also provided an envelope controller 294 (EVC), which after the attack pulse AP has been sent to respective tone generating channels from the key assigner 26, controls the envelope waveshape generator 29 to cause it to sequentially generate an attack envelope A.ENV, a first decay envelope 1D.ENV, a sustain envelope S.ENV and a second decay envelope 2D.ENV, the envelope controller generating a 2 bit envelope mode signals PMD1 and PMD0 that designate the modes of the various envelopes to be generated and a count enabling signal CE which controls the accumulating operation of an accumulator 299 (to be described later) in each envelope mode. The detail of the circuit construction of the envelope controller 294 is not shown but it functions to satisfy the following logic equations.

$$PMD1 = \overline{MD1} \cdot AEQB + MD1 \cdot \overline{AP} \quad (1)$$

$$PMD0 = AP + MD1 \cdot AEQB + MD0 \cdot MD1 + MD0 \cdot \overline{\overline{MD1} \cdot AEQB} \quad (2)$$

$$CE = \overline{AEQB} \cdot (MD1 + MD1 \cdot \overline{MD0} + MD1 \cdot MD0 \cdot DS) \quad (3)$$

In these logic equations, MD0 and MD1 are signals produced by the shift register 295 and represent present mode signals showing the envelope modes of the envelope waveshapes now being generated by respective tone generating channels. More particularly the envelope mode signals PMD1 and PMD0 generated by the EVC 294 are applied to a 16 stage (each stage comprises 2 bits) shift register 295 corresponding to the number of the tone generating channels and the mode signals in the shift register 295 are sequentially shifted each time a clock pulse $\phi$ is generated. After the 16th clock pulse, the present mode signals MD1 and MD0 of corresponding channels are generated from the last or 16th stage of the shift register 295. Each of the present mode signals MD1 and MD0 comprises two bits and as shown in the following Table 5, represents the attack envelope mode, the first decay envelope mode, the sustain envelope mode, and the second decay envelope mode.

TABLE 5

| MD1 | MD0 | envelope mode |
|---|---|---|
| "0" | "1" | attack envelope mode |
| "1" | "0" | first decay envelope mode |
| "1" | "1" | sustain envelope mode |
| "1" | "1" | second decay envelope mode |

In the aforementioned logic equations DS represents a decay start signal showing that the tone of a given tone generating channel produced by the key assigner 26 commences to attenuate. AEQB one of the output signals produced by a comparator 303 to be described later, which also represents an envelope mode termination signal. The operation of the EVC 294 will be described later in detail.

There are also provided a selector 296 which selects the attack time setting information TA, the first decay time setting information TD1 and the second decay time setting information TD2 respectively produced by the TA memory device 291, TD1 memory device 292 and TD2 memory device 293 in accordance with a combination of the present mode signals MD1 and MD0 (see Table 5) which are produced by the shift register 295, so as to produce the selected information as envelope time setting information L; and a timing pulse generator (TPG) 297 which produces a timing pulse Pd having a period corresponding to a value obtained by linearizing a value represented by the upper order four bits of the envelope time setting information L produced by the selector 296. The timing pulse generator 297 is constituted by a 13 bit binary counter 297*a* which counts the number of the channel synchronizing signals SY16 produced by the key assigner 26 for producing a total of 13 types of pulse signals P1 (corresponding to $2^1 \cdot \tau_s$) through P13 corresponding to $2^{13} \cdot \tau_s$), where $\tau_s$ represents the period of the channel synchronizing signal SY16; a selector 297*b* which selects and produces one of the pulse signals P1 through P13 produced by the binary counter 297*a* which is designated by the combination of the 4 upper order bits of the envelope time setting information L; a one bit 16 stage shift register 297*c* responsive to the output of the selector 297*b* (one of P1 through P13) for sequentially shifting its content each time a clock pulse $\phi$ is generated corresponding to each tone generating channel; an exclusive OR gate circuit 297*d* to produce a timing pulse Pd in response to the output from the last or the 16th stage of the shift register 297*c* and the pulse signal selected by the selector 297*b;* and an AND gate circuit 297*e* which is enabled to pass the timing pulse Pd produced by the exclusive OR gate circuit 297*d* only when a count enabling signal CE is produced by the EVC 294. The shift register 297*c* and the exclusive OR gate circuit 297*d* constitute a differentiating circuit which differentiates the build-up portion of a pulse signal (one of P1 through P13) having a period designated by the upper 4 bits of the envelope time setting information L for each tone generating channel.

Different from the embodiment shown in FIG. 2, the relationship between application of weights to the upper 4 bits of the envelope time setting information L selected by the selector 296 and the pulse signals P1 through P18 is such that a pulse signal having a long period is selected by the selector 297*b* when the value of the envelope time setting information L is large, as shown in the following Table 6.

TABLE 6

| | | | | | |
|---|---|---|---|---|---|
| envelope time setting information L | 72dB | 66dB | 60dB | 54dB | 48dB |
| period of timing pulse Pd | $2^{13} \cdot \tau_s$ | $2^{12} \cdot \tau_s$ | $2^{11} \cdot \tau_s$ | $2^{10} \cdot \tau_s$ | $2^{9} \cdot \tau_s$ |
| envelope time setting information L | 42dB | 36dB | 30dB | 24dB | 18dB |
| period of timing pulse Pd | $2^{8} \cdot \tau_s$ | $2^{7} \cdot \tau_s$ | $2^{6} \cdot \tau_s$ | $2^{5} \cdot \tau_s$ | $2^{4} \cdot \tau_s$ |
| envelope time setting information L | 12dB | 6dB | 9dB | | |
| period of timing pulse Pd | $2^{3} \cdot \tau_s$ | $2^{2} \tau_s$ | $2^{1} \cdot \tau_s$ | | |

Furthermore, a quasi-linear information converter 298 is provided to convert a value represented by the lower two bits of the envelope time setting information L into quasi-linear information F. For the purpose of representing the maximum amplitude value (attack level AL) of the envelope waveshape signal EW by an all "0" 8 bit signal as shown in FIG. 6*a* and representing the minimum amplitude value (final level FL) by "11111000", the value of the lower two bits are inverted by inverters 298*a* and 298*b* to form the quasi-linear information F. The attack envelope A.ENV is a curve which changes gradually from the minimum amplitude value (final level FL) "11111000" to the maximum amplitude value (attack level AL) "00000000", different from the curves of the first decay envelope 1D.ENV and the second decay envelope 2D.ENV. For this reason, at the time of generating the attack envelope A.ENV, an information in which all 11 bits are "1" is set in an accumulator 299 (to be described later) as an initial value so as to successively subtract the quasi-linear information F from this initial value. The control of this subtraction operation is effected by inverting a subtraction instruction signal AGTB ("0") produced by a comparator 303 (to be described later) by an inverter 298*c* and then by utilizing the inverted subtraction instruction signal $\overline{AGTB}$ ("1") as a complement control signal of a complement circuit for the quasi-linear information F, which comprise exclusive OR gate circuits 298*d* to 298*f.*

Aforementioned accumulator 299 operates to successively accumulate the quasi-linear information F (its complement $\overline{F}$ in the attack envelope mode) which is produced from each tone generating channel each time a timing pulse Pd is generated by TPG 297 thereby producing the upper order 8 bits of the accumulated value q·F (11 bits) as an envelope amplitude information q·F′ of each envelope mode. The accumulator 299 comprises an 11 bit adder 299*a*, a selector 299*b* which selects the sum output (q·F+F) of the adder 299*a* when the timing pulse Pd is "1", 11 bit parallel OR gate circuits 299*c* for setting in a shift register 299*d* to be described later information whose bits are all "1" as an initial value in accordance with the attack pulse AP ("1"), and a 16-stage/11-bit shift register 299*d* which sequentially shift the outputs of the OR gate circuits 299*c* by the timing operation of the clock pulse $\phi$. The accumulated value of the upper 8 bits of the accumulated value q·F of the shift register 299*d* is produced as the envelope amplitude information q·F′.

There are also provided an AND gate circuit 300 comprising a plurality of parallelly connected AND gate circuits and operates to apply the 5 bit sustain level setting information SD produced by the SD memory device 290 to a comparator 303 to be described later as target amplitude information A when the present mode signal MD1 is "1", that is when it becomes the first decay envelope mode (see Table 5); and an OR gate circuit 301 comprising a plurality of parallelly connected OR gate circuits which renders all 5 bits of the target amplitude information A to "1", which is applied to a comparator 303 when both of the present mode signals MD1 and MD2 become "1", and hence the AND gate circuit 302 produces an "1" output, that is when a sustain mode is reached (see Table 5). One of the inputs of these OR gate circuits are supplied with the outputs of the AND gate circuit 300.

Aforementioned comparator 303 is connected to receive at its B input the envelope amplitude information q·F′ comprising the upper order 8 bits of the accumulated value produced by the shift register 299*d* of the accumulator 299 as the present amplitude information B and to receive at its A input the target amplitude information A produced by the OR gate circuit 301. When the target amplitude information A becomes equal to the present amplitude information B, the comparator 303 produces a coincidence signal (A=B) as an envelope mode termination signal AEQB and an output (A>B) as a subtraction instruction signal AGTB when the target amplitude information A becomes larger than the present amplitude information B. As above described, the envelope mode termination signal AEQB and the subtraction instruction signal AGTB are supplied to EVC 294 and quasi-linear information converter 298 respectively. Since the target amplitude information A applied to the A input of the comparator 303 is made up of 5 bits and the present amplitude information B applied to the B input is made up of 8 bits, for the purpose of matching the number of bits of the inputs, the lower order 3 bits of the input applied to input terminal is made always to be "0".

Figure 7A:
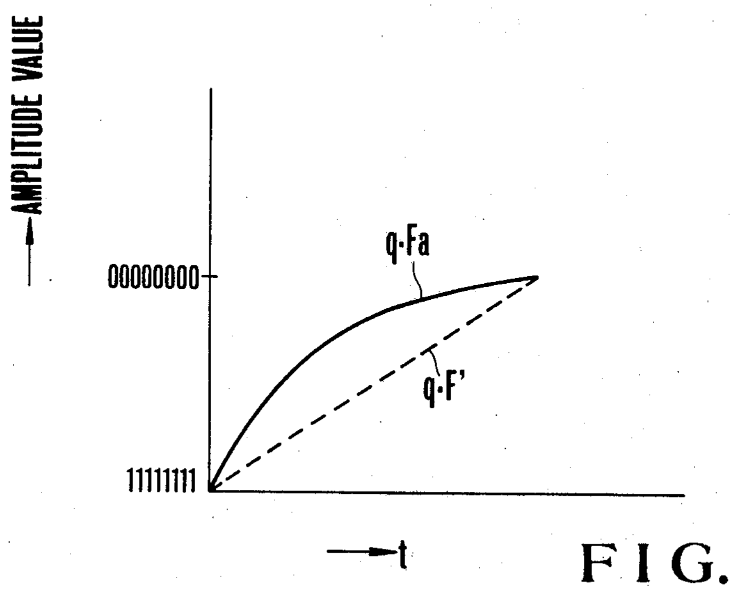
Figure 7B:
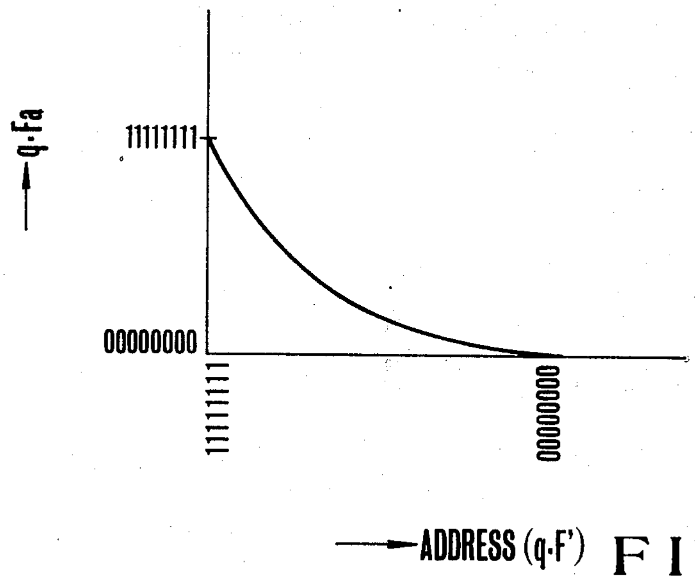

Next to the comparator 303 is provided an attack curve converter (ACC) 304 for converting the envelope amplitude information q·F′ produced by the accumulator 299 during the attack envelope mode into envelope amplitude information q·Fa represented by a curve shown in FIG. 7*a*. The attack curve converter 304 is constituted by a memory device storing the amplitude values of an envelope curve as shown in FIG. 7*b* in respective addresses thereof and addressed by the envelope amplitude information q·F′.

Figure 4:
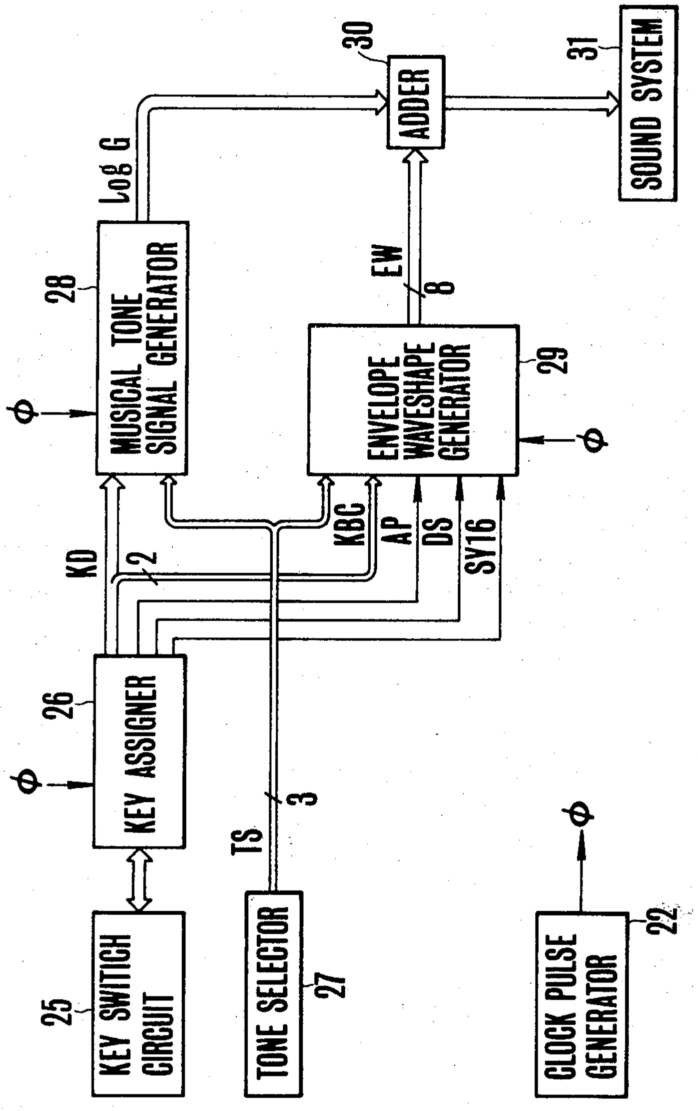
FIG. 4 is a general block diagram showing one example of an electronic musical instrument utilizing the function generator of this invention as an envelope waveshape generator.

There is also provided a selector 305 which selects the envelope amplitude information q·F′ supplied to its input A from the accumulator 299 when the present mode signal MD1 is "1", whereas selects the envelope amplitude information q·Fa applied to its B input from the ACC 304 when MD1 is "0" so as to produce the selected information as an envelope waveshape signal EW which is supplied to the adder 30 of the electronic musical instrument shown in FIG. 4 to be added to the musical tone signal log G in the form of a logarithm.

The embodiment shown in FIG. 5 operates as follows. The operation of the EVC 294 will firstly be described by using the logic equations 1, 2 and 3 and a time chart shown in FIG. 6. In a certain tone generating channel time during which an attack pulse AP commanding the start of the generation of the envelope waveshape signal EW is not given by the key assigner 26, both of the present mode signal MD1 and MD0 produced by the shift register 295 during the given channel time are "1". Furthermore, the envelope termination signal AEQB produced by the comparator 303 becomes "1" because generation of the second decay envelope 2d.ENV of a preceding envelope termination signal EW has been completed. For this reason, in logic equation 1, MD1·$\overline{AP}$="1" so that the envelope mode signal PMD1="1" and MD0·$\overline{MD1}$·AEQB and MD1·AEQB in equation (2) are both "1", whereby the envelope mode signal PMD0 also becomes "1". These envelope mode signals PMD1 and PMD0 are applied to the shift register 295 during the given channel time. Thereafter these envelope mode signals are shifted sequentially in the shift register 295 each time a clock pulse $\phi$ is generated and fed back to the EVC 294 as the present mode signal MD1 and MD0 during the given channel time after 16 clock pulses. The EVC 294 again performs the operation of the logic equations to again produce the envelope mode signals PMD1 and PMD0 of "1" where an attack pulse AP is not supplied from key assigner 26 in the given channel time.

Thus, it may be considered that envelope modes corresponding to 16 tone generating channels are stored in respective stages of the shift register 295. Under these conditions, when an attack pulse AP ("1") is applied during a given channel time, the term $\overline{AP}$ of logic equation (1) becomes "0" whereby the term MD1·$\overline{AP}$ also becomes "0" and the envelope mode signal PMD1 also becomes "0". In the logic equation (2) when the term AP becomes "1", the envelope mode signal PMD0 also becomes zero. Thus, the state "1" of the envelope mode signal PMD0 would not be changed. The envelope mode signal PMD1 which become "0" and the envelope mode signal PMD0 which become "1" are applied to the shift register 295 so that the present time mode signals MD1 and MD0 produced by the shift register 295 in the given channel time are "0" and "1" respectively (see FIG. 6*f*).

These states MD1="0" and MD0="1" show the attack envelope mode as shown in Table 5. When the mode of the attack envelope is designated in this manner, the target amplitude value (attack level AL) of the attack envelope A.ENV is applied to the comparator 303 so that the envelope termination signal AEQB produced by the comparator 303 becomes "0" as shown in FIG. 6*e*.

As a consequence, the term $\overline{AEQB}\cdot\overline{MD1}$ in equation (3) becomes "1" and the count enabling signal CE also becomes "1" (see FIG. *6f*) so that the generation of the attack envelope A.ENV in the given tone generating channel is commenced. Thereafter when the amplitude value of the attack envelope reaches the target amplitude information A, that is the attack level AL, the comparator 303 produces an envelope mode termination signal AEQB ("1"). At this time, since the present mode signal MD1="0", the term $\overline{MD1}$·AEQB of equation (1) becomes "1" and the envelope mode signal PMD1 also becomes "1", and these signals are applied to the shift register 295. On the other hand in the logic equation (2) since MD1="0" ($\overline{MD1}$="1") and MD0="1", both MD1·AEQB and MD0·MD1 become "0". In addition, due to the fact that AEQB becomes "1", MD0·$\overline{MD1}$·AEQB also becomes "0". Accordingly, the envelope mode signal PMD0 becomes "0" and applied to the shift register 295, whereby the present mode signals MD1 and MD0 produced by the shift register 295 become "1" and "0" respectively (see FIGS. *6f* and *6j*) thus representing the first decay envelope mode. The count enabling signal CE in equation (3) becomes "0" when the envelope mode termination signal AEQB becomes "1". Immediately thereafter the mode is transferred to the first decay envelope mode to give the target amplitude information A (sustain level SL) of the first decay envelope 1D·ENV, the term $\overline{AEQB}$ becomes "1" whereby the term $\overline{AEQB}$ (MD1·$\overline{MD0}$) becomes "1" thus again changing the count enabling signal CE to "1" state. Thus, the generation of the first decay envelope 1D.ENV in the given tone generating channel is commenced. Thereafter, when the amplitude value of the first decay envelope value reaches the target amplitude information A, that is the sustain level AL, the comparator 303 again produces the envelope mode termination signal AEQB ("1"). Accordingly, the term MD1·AEQB becomes "1" and the envelope mode signal PMD0 also becomes "1", with the result that the present mode signal MD0 produced by the shift register 295 becomes "1". Since MD1·$\overline{AP}$ became "1", the envelope mode signal PMD1 maintains its "1" state, whereby the present mode signal MD1 is also maintained at its "1" state. As a consequence, the envelope mode becomes the sustain envelope mode. In logic equation (3) since the term $\overline{AEQB}$ becomes "0", the count enabling signal CE also becomes "0". On the other hand since the envelope mode becomes the sustain mode, the target amplitude information A (final level FL) of the second decay envelope 2D.ENV is given again. For this reason, although the envelope mode termination signal AEQB produced by the comparator 303 becomes "0" since both MD1 and MD0 are "1" and since the decay start signal DS is "0", the logic equation (3) does not hold whereby the count enabling signal CE is maintained at its "0" state and a sustain envalope S.ENV whose amplitude value does not vary would be formed.

When a depressed key of a given tone generating channel is released, the key assigner 26 produces a decay start signal DS ("1"). Accordingly, the term MD1·MD0·DS in equation (3) becomes "1" and the count enabling signal CE also becomes "1", whereby generation of the second decay envelope 2D.ENV is commenced. Thereafter, when the amplitude value of the second decay envelope reaches the target amplitude information A that is the final level FL, the comparator 303 again produce an envelope termination signal AEQB ("1") with the result that $\overline{AEQB}$ (MD1·MD0·DS) in equation (3) becomes "0" thus turning the count enabling signal CE to "0". The control of the generation of the envelope waveshape in a given tone generating channel is effected as above described and similar operation is performed when an attack pulse AP is applied again.

Figure 6:
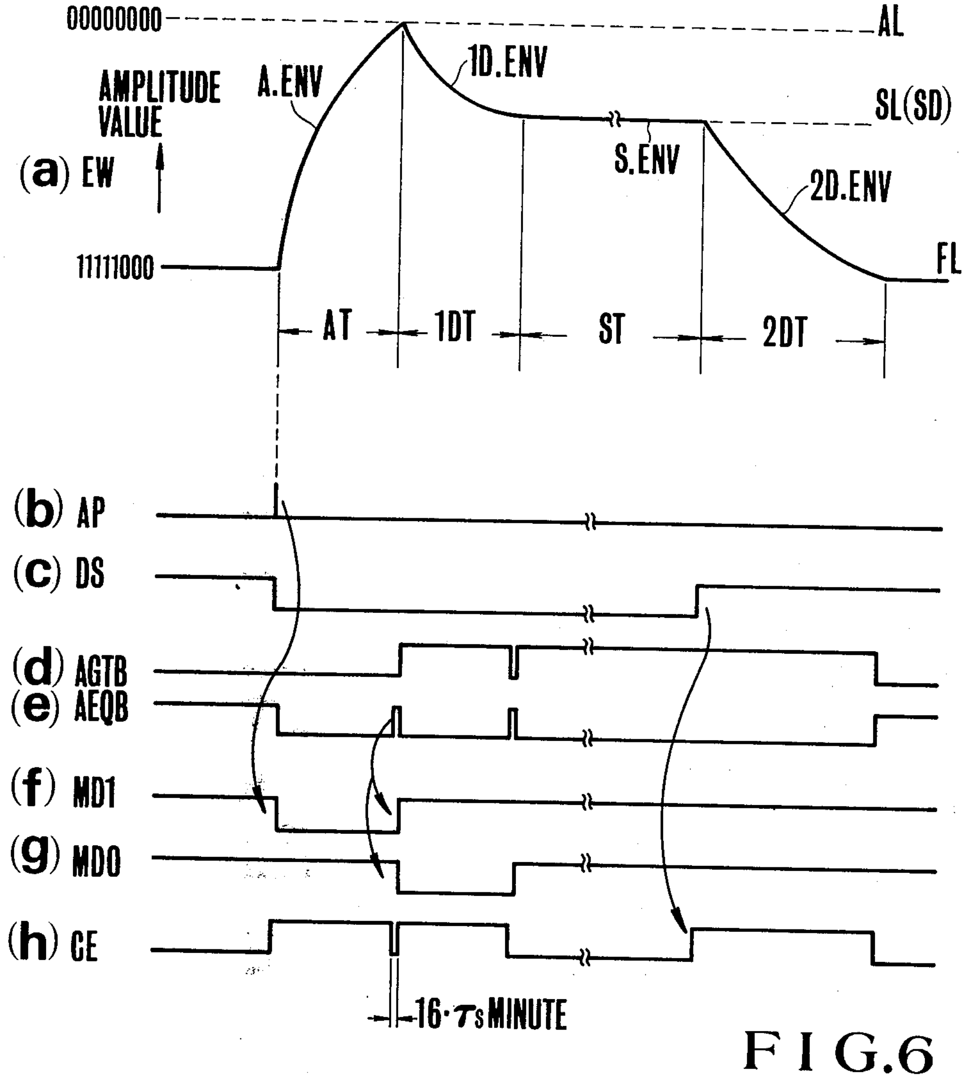
FIGS. 6, 7A, 7B, 8A, and to 8B are waveshapes at various portions useful to explain the operation of the envelope waveshape generator shown in FIG. 5.

In the time chart shown in FIG. 6, a signal AGTB shown in FIG. *6d* will be described later.

In equation (2), the reason that PMD0 is made to become "1" when the attack pulse AP is "1" is to prevent failure of the commencement of the generation of the envelope waveshape EW in response to the application of the attack pulse AP when PMD0 is maintained at "0" state by any cause.

The general operation of the envelope waveshape generator 29 will be described in the following.

The keyboard code KBC among the key information produced by the key assigner 26 on the time division basis, and the tone color selection signal TS produced by the tone color selector 27 are applied to the SD memory device 290, TA memory device 291, TD1 memory device 292 and the TD2 memory device 293 of the envelope waveshape generator 29 to act as address signals whereby a keyboard code KBC assigned to each tone generating channel, sustain level setting information corresponding to a tone color selection signal TS, attack time setting information TA, and first and second decay time setting information TD1 and TD2 are read out on the time division basis from the memory devices 290 through 293 in synchronism with respective channel times.

The key assigner 26 produces, on the time division basis, the attack pulse of each tone generating channel as well as a channel synchronizing signal SY16 in synchronism with the 16th channel time, the former attack pulse AP being applied to EVC 294 while the channel synchronizing signal 16 to the TPG 297. In response to the attack pulse AP, the EVC 294 produces the envelope mode signals PMD1 and PMD0 and the count enabling signal CE according to equations (1), (2) and (3).

The binary counter **297*a* of TPG 297** counts the number of the channel synchronizing signal SY16 to parallelly produces pulse signals P1 through P13 having the periods of $2^{1}\cdot\tau_s$–$2^{13}\cdot\tau_s$ respectively. To simplify the description let us consider a case in which an envelope waveshape signal EW is to be generated in response to depression of a key assigned to a given tone generating channel.

When an attack pulse AP of a tone generating channel is applied, the OR gate circuit **289*c* produces 11 bit information in which all bits are "1" which is set in the shift register 289*d* as an initial value. In response to the attack pulse AP, the EVC 294 produces two bit envelope mode signals PMD1="0" and PMD0="1" according to equations (1) and (2). These envelope mode signals PMD1 and PMD0 are set in the shift register 295 by the clock pulse $\phi$ and then produced by the register as present mode signals MD1="0" and MD0="1". These two bit present mode signals MD1 and MD0 represent an attack envelope mode. Then the selector 296 selects the attack time setting information TA produced by the TA memory device 291. The upper order 4 bits of the attack time setting information TA are applied to the selector 297*b* of TPG 297 whereby the selector 297*b* selects a pulse signal designated by the combination of the upper 4 bits of the attack time setting signals P1 through P13 produced by the binary counter 297***a*. Assume now that the attack time setting information TA shows 63 dB (TA: "101010") the selector 297*b* would select and produce a pulse signal P11 having a period of $2^{11}\cdot\tau_S$. The build-up portion of the pulse signal P11 selected by the selector 297*b* is differentiated by the differentiating circuit constituted by the shift register 297*c* and the exclusive OR gate circuit 297*d* to produce a timing pulse Pd having the same width as the clock pulse $\phi$ and a period of $2^{11}\cdot\tau_S$.

When the present mode signal MD1 becomes "0" the AND gate circuit 300 is disabled to intercept the sustain level information SD so that the target amplitude information A applied to input A of the comparator 303 becomes "0", whereby the envelope termination signal AEQB produced by the comparator 303 becomes "0" and the EVC 294 produces an enabling signal CE according to equation (3). Then the AND gate circuit 297*e* of TPG 297 is enabled by the count enabling signal CE thus sending out a timing pulse Pd having a period of $2^{11}\cdot\tau_S$ corresponding to a value obtained by converting 60 dB (the upper 4 bits of TA) into a linear value and the accumulator 229 sequentially accumulates the quasi-linear information F (1.500) which is obtained by converting a value (3 dB) shown by the two lower bits of the attack time setting information TA produced by quasi-linear converter 298 based on the initial value (comprising 11 bits which are all "1") set in the shift register 299*d*. At this time, since the subtraction instruction signal AGTB (see FIG. 6*d*) produced by the comparator 303 is "0" the quasi-linear information F shown by lower two bits of the attack time setting information TA is produced by the quasi-linear converter 298 as complemented quasi-linear information $\overline{F}$. Consequently, in the accumulator 299, the quasi-linear information F is sequentially subtracted from the initial value (comprising 11 bits which are all "1") set in the shift register 299*d* by the attack pulse AP each time a timing pulse Pd is generated. As a consequence, the accumulated value q·F of the accumulator 299 that is the envelope amplitude information q·F′ varies gradually toward the attack level AL (AL" 00000000) at a period of $2^{11}\cdot\tau_S$ thus forming an attack envelope A.ENV shown in FIG. 6*a*. When all bits (the upper 8 bits of the accumulated value q·F) of the envelope amplitude information q·F′ produced by the accumulator 299 become "0" the comparator 303 produces an envelope mode termination signal AEQB ("1"). When this signal becomes "1" the EVC 294 stops to send out the count enabling signal CE ("1") and produces envelope mode signals PMD1="1" and PMD0="0". These signals are applied to the shift register 295 and are shifted therethrough by each clock pulse $\phi$ and finally produced from the final stage as a present mode signals MD1="1" and MD0="0" representing the first decay envelope mode. As the present mode signal MD1 becomes "1" the AND gate circuit 300 is enabled to pass the sustain level setting information SD produced by the SD memory device 290, and information SD is applied to the input A of the comparator 303 via the OR gate circuit 301 as the target amplitude information A of the first decay envelope mode.

At this time since the envelope amplitude information q·F′ consisting of 8 bits (all "0") is applied to input B of the comparator 303, the envelope mode termination signal AEQB produced thereby is "0" and the subtraction instruction signal AGTB becomes "1". As a consequence the EVC 294 produces again the count enabling signal CE according to equation (3). At this time since the present mode signals MD1="1" and MD0="0", the selector 296 selects the first decay time setting information TD1 produced by the TD1 memory device 292 and applies it to the TPG 297. Suppose now that the first decay time setting information TD1 represents 48 dB (TD1: "100000") the TPG 297 would produce a timing pulse Pd having the same width as the clock pulse $\phi$ and period of $2^{9}\cdot\tau_S$. The value "0 dB" shown by the lower two bits of the first decay time setting information TD1 is converted by LLC 298 to corresponding quasi-linear information F ("1") and the applied to the adder 299*a* of the accumulator 299. In this case, the quasi-linear information F produced by quasi-linear information converter 298 is different from that during the attack envelope mode and it is not converted into a complement because the subtraction instruction signal AGTB is "1" but the quasi-linear signal applied to the accumulator 299 without any change. Accordingly, with the first decay envelope mode, the accumulator 299 sequentially adds the quasi-linear informations F at a period of $2^{9}\cdot\tau_S$. As a consequence, the envelope amplitude information q·F′ produced by the accumulator 299 successively changes from attack level AL to sustain level SL (the value of the sustain level setting information SD) at a period of $2^{9}\cdot\tau_S$, thereby forming the first decay envelope 1D.ENV. When the envelope amplitude information q·F′ coincides with the sustain level setting information SD, the comparator 303 would produce an envelope termination signal AEQB ("1"). Then the EVC 294 stops sending out of the count enabling signal CE ("1") and instead produces new envelope mode signals PMD1="1" and PMD0="1". These envelope mode signals are applied to the shift register 295, shifted therethrough by the clock pulse $\phi$ and finally produced from the last stage of the shift register as the present mode signals MD1 "1" and MD0="1". When these present mode signals become "1", the AND gate circuit 300 produces "1" output and the OR gate circuit 301 applies to input A of the comparator 303 information "11111000" as the target amplitude information A (final level FL) during the second decay envelope mode. At this time, since the envelope amplitude information q·F′ having the same value as the sustain level setting information SD is being applied to input B, the envelope termination signal AEQB produced by the comparator 303 becomes "0", whereas the subtraction instruction signal AGTB becomes "1". Even when the envelope mode termination signal AEQB becomes "0", since both of the present mode signal MD1 and MD0 are "1", the count enabling signal CE maintains its "0" state (see equation (3)) and the AND gate circuit 397*e* of TPG 297 is disabled. Accordingly, the timing pulse Pd is not applied to the accumulator 299 and the selector 299*b* continues to select an input to its input A, that is the accumulated value q·F produced by the shift register 299*d*. As a consequence, the envelope amplitude information q·F′ produced by the accumulator 299 does not vary but is maintained at the value of the sustain level setting information. This state persists until the key assigner 26 produces a decay start signal DS in a given channel time, thereby forming a sustain envelope S.ENV shown in FIG. 6*a*. When the key assigner 26 produces a decay start signal DS ("1") the EVC 294 again produces a count enabling signal CE ("1"). At this time, since the present mode signals MD1 and MD0 are both "1" selector 296 selects the second decay time information TD2 produced by the TD2 memory device 293 and supplies it to the TDG 297 suppose now that the second decay time information TD2 has a value of 12 dB (TD2: "001000"), the TPG 297 would produce a timing pulse pd having the same width as the clock pulse $\phi$ and a period of $2^3 \cdot \tau_S$.

On the other hand the value (0dB) shown by the lower two bits of the second decay time setting information TD2 is converted by LLC 298 into corresponding quasi-linear information F("1") and then applied to the adder 299*a* of the accumulator. Then the accumulator 299 sequentially adds the quasi-linear information F("1") each time a timing pulse Pd is generated having a period of $2^3 \cdot \tau_S$. Consequently, the envelope amplitude information q·F' produced by the accumulator 299 varies gradually towards the final level FL from the sustain level SL (value of the information SD) at a period of $2^3 \cdot \tau_S$, thus forming the second decay envelope 2D·ENV shown in FIG. 6*a*. When the envelope amplitude information q·F' reaches the final level FL (FL: "11111000") the comparator 303 produces an envelope termination signal AEQB ("1"). Concurrently therewith, the subtraction instruction signal AGTB becomes "0". When the envelope mode termination signal AEQB becomes "1", EVC 294 stops sending out of the count enabling signal CE ("1") until the given tone generating channel produces again an attack pulse AP.

As above described, the envelope amplitude information q·F' produced by the accumulator 299 at respective envelope modes are applied to the ACC 304 as address signals and to the input A of the selector 305. The envelope amplitude information q·F' at the attack envelope mode is converted into envelope amplitude information q·F*a* shown in FIG. 7*a* by ACC 304 and then produced as an envelope waveshape signal EW via selector 305. The envelope amplitude information q·F' at the sustain envelope mode, the first decay envelope mode and the second decay envelope mode is produced as an envelope waveshape signal EW via selector 305 when the present mode signal MD1 is "1". In the adder 30 (FIG. 4), this envelope waveshape signal EW is added to a musical tone signal G in the form of a logarithm and the sum is then supplied to the sound system 31. The purpose of adding a musical tone in the form of log G and the envelope waveshape signal EW in the form of a natural number to impart an amplitude envelope is to increase naturality of the musical tone finally produced by the sound system. Thus, the sum Σ of the adder 30 is expressed by:

$$\Sigma = \log G + EW = \log G + \log [\exp EW]$$

When converted into a natural number, the sum becomes:

$$\Sigma = G \times e^{EW}$$

Figure 8A:
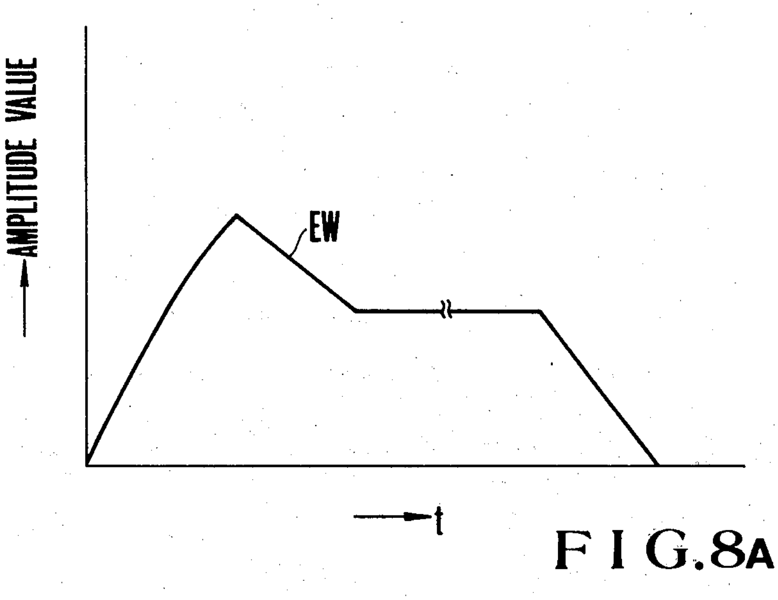
Figure 8B:
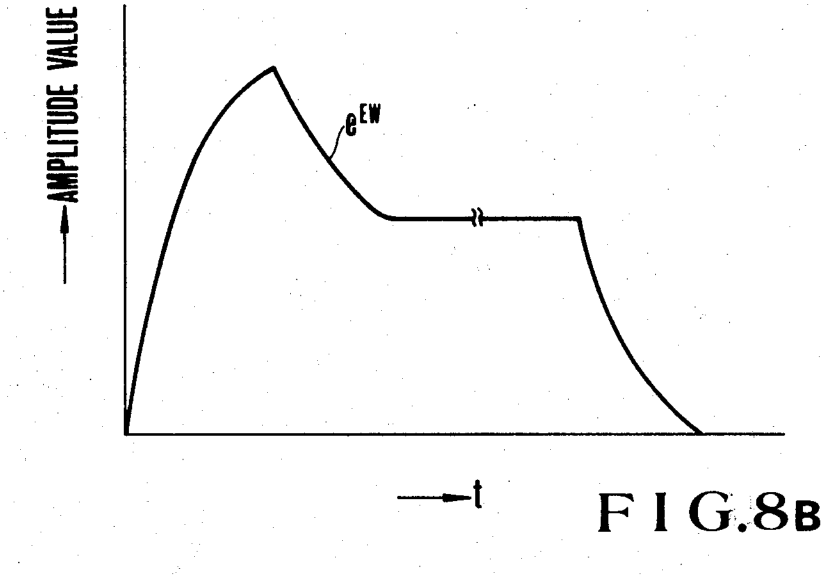

This means that even when the envelope waveshape signal EW varies linearly as shown in FIG. 8*a*, actually this is equivalent to multiply the envelope waveshape signal EW which varies expontially as shown in FIG. 8*b* with the musical tone signal, whereby it is possible to produce musical tones rich in naturality. Furthermore, it is possible to reprevent a large amplitude value with an envelope waveshape signal with a smaller number of bits.

As above described, according to this embodiment, since it is possible to set the width of variation with time of the envelope waveshape signal EW can be set in a range of from $1 \cdot \tau_S$ to $4096 \cdot \tau_S$ in accordance with time setting information for determining a time-dependent variable of only 6 bits, the number of varying the amplitude envelope can be made free, thus producing musical sounds of many type.

Although the musical tone generating circuit of the electronic musical instrument of this embodiment was shown as comprising 16 tone generation channels, but there may be a case in which a single tone is formed by synthesizing 16 harmonics. In such case the channel assigning signal SY16 should be SY256 (16 tones×16 harmonics), shift registers 295, 297*c* and 299*d* should have 256 stages and it is necessary to add signals representing the order numbers of respective harmonics to address signals of SD memory device 290, TA memory device 291, TD1 memory device 292, and TD2 memory device 293.

As above described, the function generator of time-dependent variable type of this invention comprises quasi-linear information converting means which converts information representing time information regarding the duration time of a time function waveshape and expressed in terms of decibel (logarithm) and having value less than 6 dB into a quasi-linear information, timing pulse generating means which generates a timing pulse having a period corresponding to a value obtained by converting time information having a value not smaller than 6 dB, and accumulating means which accumulates the quasi-linear information at a period of generation of the timing pulse so as to produce the accumulated value of the accumulating means as a time function waveshape corresponding to the time setting information.

For this reason it is possible to set in an extremely wide range the rate of variation with time of the value of the time function waveshape with a small number of bits. Moreover, as no conventional logarithm-natural number converter is used it is possible to simplify the circuit construction. When the function generator is used as an envelope waveshape generator of an electronic musical instrument it is possible to produce a number of envelope waveshape signals which vary variously thereby producing a musical tone rich in naturality.

It should be understood that the invention is not limited to the specific embodiments described above and that many changes and modifications may be made without departing the true scope of the invention as defined in the appended claims.

For example, in the foregoing description, for the purpose of converting the time information interms of a decibel value into a natural number, "1" was added to the lower bits of the time information. However, such convertion may be mode with a logarithm-natural number converter. Furthermore, while the number of bits at orders higher than 6 dB of the time information was made to be 4 bits, it is possible to make it to be larger than 4 bits, in which case the construction of the binary counter 131 of the TPG shown in FIG. 3 should be changed.

Furthermore, instead of dividing the bits of the time information into linear information bits and time information bits by using 6 dB as a reference, the reference decibel may changed to another values. It should also be understood that instead of representing the time information in terms of a decibel value logarithmic value can also be used.

What is claimed is:

1. A function generator of time-dependent variable type which generates a time function waveshape which varies with time at a rate corresponding to time information for determining a time-dependent variable, comprising:

means for setting multi-bit digitalized information which represents time information in terms of a logarithm;

means for dividing the bits of said time information into upper order bits and lower order bits at a bit of a predetermined order;

means for converting a portion of said time information represented by said lower order bits into linear information;

a timing pulse generator which produces a timing pulse having a period corresponding to a value obtained by converting a portion of said time information represented by said higher order bits into a natural number; and Accumulating means for acculating said linear information produced by said converting means at a period of said timing pulse generated by said timing pulse generator thereby producing an accumulated value of said accumulating means as said time function waveshape which varies with time at a rate corresponding to said time information.

2. A function generator according to claim 1 wherein said logarithm representation is a decibel representation.

3. A function generator according to claim 2 wherein said bit of predetermined order corresponds to a value of 6 dB.

4. A function generator according to claim 3 wherein said linear information is formed by adding "1" to a bit which is a most significant bit with respect to said lower order bits.

5. A timing function waveshape generator according to claims 3 or 4 wherein said timing pulse generator comprises a free running binary counter, a selector for selecting one of the counts of said counter having a period corresponding to said portion of said time information at orders higher than said predetermined order bit corresponding to 6 dB, and a differentiating circuit which differentiates an output of said selector for producing the timing pulse having a period corresponding to a value obtained by converting said portion of information not smaller than 6 dB into a natural number.

6. A function generator according to claim 1 or 2 including means for selecting said time information from a plurality of time informations.

7. A function generator according to claim 6 which further includes means for switching the information to be selected when an accumulated value of said accumulating means reaches a predetermined value.

8. A function generator according to claim 1 or 2 which further comprises means for applying an initial value to said accumulating means.

9. A function generator according to claim 8 which further comprises means for determining a polarity of an accumulated value of the linear information with respect to said initial value.

10. A function generator according to claim 8 including means for selecting said time information from a plurality of time informations, and wherein said function generator further comprises means for switching the information to be selected when an accumulated value of said accumulating means reaches a predetermined value, means for setting an initial value in said accumulating means, means for determining a polarity of said accumulated value of the linear information with respect to said initial value, and means for controlling said polarity determining means when said accumulated value reaches the predetermined value.

* * * * *